T. M. BOGGS.
BORING, DRILLING, AND TAPPING MACHINE.
APPLICATION FILED NOV. 15, 1907.
920,011. Patented Apr. 27, 1909.
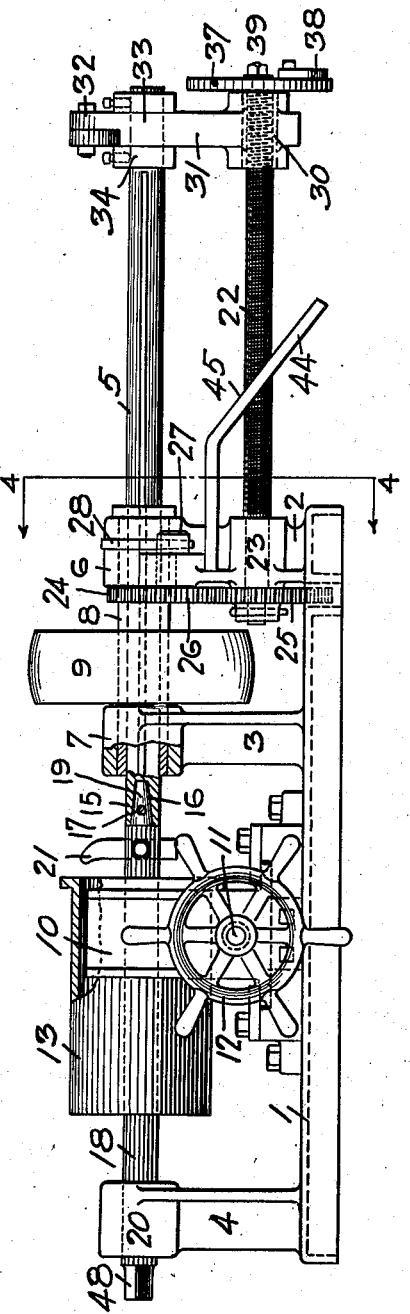
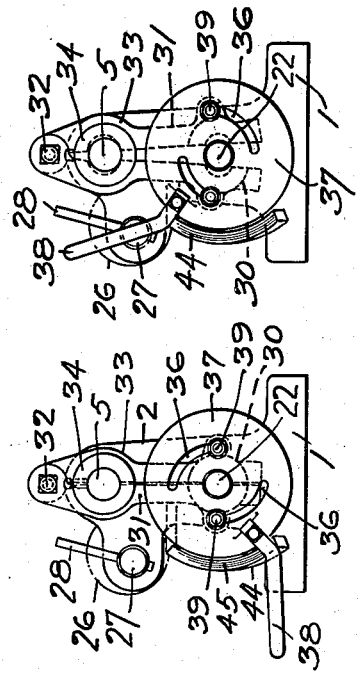
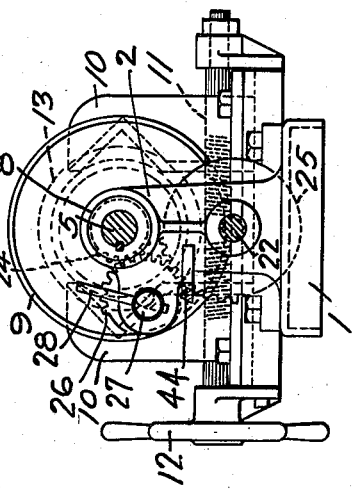
WITNESSES.
INVENTOR.

UNITED STATES PATENT OFFICE.

THADDEUS M. BOGGS, OF MONONGAHELA, PENNSYLVANIA.

BORING, DRILLING, AND TAPPING MACHINE.

No. 920,011.   Specification of Letters Patent.   Patented April 27, 1909.

Application filed November 15, 1907. Serial No. 402,358.

*To all whom it may concern:*

Be it known that I, THADDEUS M. BOGGS, a resident of Monongahela city, in the county of Washington and State of Pennsylvania, have invented a new and useful Improvement in Boring, Drilling, and Tapping Machines; and I do hereby declare the following to be a full, clear, and exact description thereof.

This invention relates especially to metal boring machines but is also adapted for metal drilling, tapping and like machines.

The object of the invention is to provide a simple and efficient machine of the character specified.

The invention comprises the construction and arrangement of parts hereinafter described and claimed.

In the accompanying drawings Figure 1 is a side view of a boring machine embodying the invention; Fig. 2 is an end view of the same showing the feeding nut in closed position; Fig. 3 is a similar view with the feeding nut in open position; and Fig. 4 is a vertical transverse section on the line 4—4, Fig. 1.

In the drawing the invention has been shown as applied to a boring machine but with a slight modification it can also be applied to drilling or tapping machines. As shown, the machine comprises a suitable bed plate 1 having thereon standards or housings 2, 3 and 4. The spindle or shaft of the machine is shown at 5 and this is a straight cylindrical bar rotatably mounted in bearings 6 and 7 carried at the upper ends of the standards or housings 2 and 3 respectively. This spindle has a suitable splined connection with a sleeve 8 located between the bearings 6 and 7 and which serves as the means for transmitting power or rotary movement to the spindle 5. This rotary movement may be given by any suitable mechanism, the drawing showing for this purpose a belt pulley 9.

The chuck is shown as comprising jaws 10 actuated by a screw 11 carrying a hand wheel 12, said chuck being shown as holding a cylinder 13 comprising the work being operated upon. Any other suitable form of work holding chuck may be employed.

The end of the spindle 5 is provided with a socket 15 adapted for carrying various forms of standard tools, said socket being shown as provided with a standard taper opening 16 and transverse key-way 17, such as used for holding standard forms of drills and taps. When used for boring purposes a suitable boring bar 18 is employed, this having at one end a taper shank 19 held in the socket 15 and having its opposite end mounted and guided in the bearing 20 at the upper end of the standard or housing 4. The boring tool is shown at 21.

The feeding mechanism comprises a screw 22 rotatably mounted in a bearing 23 and extending parallel to the spindle 5. This screw is driven from the spindle 5 by any suitable gearing, that shown comprising a gear 24 secured on the sleeve 8, a gear 25 secured to the screw 22, and an intermediate gear 26 carried by a stud 27, having a mounting eccentric to the center of the gear 26 and provided with a suitable handle 28 for rotating said stud in order to bring the gear 26 into mesh with the gears 24 and 25 or throw the same out of mesh therewith, as when it is desired to stop the feed of the tool.

The feeding connection between the screw 22 and spindle 5 is secured by a suitable split nut engaging the screw and comprising the two nut sections 30 carried on the lower ends of arms 31 pivoted together at 32 and having semi-circular portions 33 embracing the spindle 5 and held against longitudinal movement on said spindle by means of collars 34 secured to the spindle 5 and lying on either side of the curved portions 33 of the arms carrying the split nut. The nut sections are shown formed integral with said arms and other parts described and this is preferred, although they may be separate portions secured to said arms.

The split nut is locked to hold it closed in engagement with the feed screw 22 by means of eccentric or cam slots 36 on a disk 37 provided with a handle 38. The disk is held concentric with the screw, being held by the studs 39 on the nut sections, said studs extending into the cam slots 36. When the disk is in the position shown in Fig. 2 the nut sections 30 are closed on the feeding screw, as when feeding the spindle or bar forwardly. When drawing the spindle backwardly the disk is rotated by operating the handle 38 and through the eccentric slots 36 and studs 39, swinging the nut sections apart to the position shown in Fig. 3, in which open position they are locked by the cam slots in the disk. Consequently the split nut cannot accidentally swing against the screw to the injury of the threads of the nut or screw, or both. The handle 38 is quite heavy so that the disk rotates automatically to the position shown in Fig. 2. Means are also preferably provided for automatically disengaging the split nut from the feed screw when the tool has been fed forward the proper or pre-determined distance. This means is shown as a stationary projection 44 having an inclined or cam face 45 up which the projecting handle 38 of the disk moves as the feeding nut moves forwardly, said cam face serving to raise the handle and rotate the disk sufficiently to separate the split nut from the screw and stopping the forward feed.

The operation of the machine will be readily understood from the foregoing description. The forward feed can at any time be stopped or entirely thrown out by merely operating the handle 28 to rotate the eccentric stud 27 and throw the gear 26 out of mesh with the gears 24 and 25. The forward feed is also automatically stopped by the cam face 45, as heretofore described. The split nut provides a simple and efficient means for giving the feed, or for disengaging the same to permit the boring spindle to be drawn back. The taper socket on the spindle provides a convenient means for the insertion of any standard or special tool. When the machine is to be used for drilling or tapping purposes the boring bar 18 is removed and the drill or tap, as the case may be, secured in the socket 15. The feeding mechanism operates exactly the same with a drill or tap as with a boring bar. The gears 24, 25 and 26 will be so proportioned that the proper rate of feed is secured and when used for tapping purposes will of course be of such relative size as to feed the tap forwardly at the same rate as the pitch of the threads on the tap. If desired, the boring bar 18 may be provided with a square end, as shown at 48, to which a crank or the like may be attached for converting the same into a hand machine.

What I claim is:

1. In boring and like machines, the combination of a driven spindle, a tool socket carried thereby, bearings in which said spindle is mounted to rotate and slide, a feed screw parallel to said spindle, gearing connecting the spindle and screw, means for disconnecting said gearing, a split nut carried by the spindle, and means for engaging the same with and disengaging the same from the screw.

2. In boring and like machines, the combination of a driven spindle, a tool socket carried thereby, bearings in which said spindle is mounted to rotate and slide, a feed screw parallel to said spindle, gearing connecting the spindle and screw, means for disconnecting said gearing, a split nut carried by the spindle, means for engaging the same with and disengaging the same from the screw, and means arranged to automatically disengage the nut from the screw at a predetermined point of feed.

3. In boring or like machines, the combination of a driven rotary spindle, a feed screw parallel therewith, gearing connecting said spindle and screw, arms pivotally connected together and embracing said spindle to move longitudinally therewith, means for holding said arms against independent longitudinal movement on said spindle, nut sections carried by said arms, a disk connected with and slidable along said screw and provided with a pair of oppositely arranged cam-slots, and studs carried by the nut-sections and projecting into said slots.

4. In boring and like machines, the combination of a driven rotary spindle, bearings in which said spindle is mounted to slide and rotate, a feed screw parallel to said spindle, gearing connecting said spindle and screw, a pair of arms pivotally connected and engaging the spindle to move longitudinally therewith, a disk concentric with and slidable along said screw and provided with oppositely arranged cam slots, studs on the nut sections projecting into said slots, an arm on said disk, and a stationary cam member in the path of movement of said arm and arranged to rotate the disk and open the nut sections.

In testimony whereof, I the said THADDEUS M. BOGGS have hereunto set my hand.

THADDEUS M. BOGGS.

Witnesses:
ROBERT C. TOTTEN,
J. R. KELLER.